United States Patent
Persent et al.

(10) Patent No.: US 10,704,341 B2
(45) Date of Patent: Jul. 7, 2020

(54) CONNECTOR FOR ASSEMBLING TWO RISER SEGMENTS, COMPRISING AN INTERNAL LOCKING RING AND REMOVABLE PINS

(71) Applicant: IFP Energies nouvelles, Rueil-Malmaison (FR)

(72) Inventors: Emmanuel Persent, Croissy sur Seine (FR); Gerard Papon, Les Essarts le Roi (FR); Fabrice Deleau, Pierre-Benite (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 101 days.

(21) Appl. No.: 16/061,227

(22) PCT Filed: Nov. 15, 2016

(86) PCT No.: PCT/EP2016/077754
§ 371 (c)(1),
(2) Date: Jun. 11, 2018

(87) PCT Pub. No.: WO2017/102220
PCT Pub. Date: Jun. 22, 2017

(65) Prior Publication Data
US 2018/0363390 A1    Dec. 20, 2018

(30) Foreign Application Priority Data
Dec. 17, 2015  (FR) .................................... 15 62605

(51) Int. Cl.
*E21B 17/08*   (2006.01)
*E21B 17/046*  (2006.01)
(Continued)

(52) U.S. Cl.
CPC .......... *E21B 17/085* (2013.01); *E21B 17/046* (2013.01); *E21B 33/038* (2013.01);
(Continued)

(58) Field of Classification Search
CPC .... E21B 17/085; E21B 17/046; E21B 33/038; F16L 25/06; F16L 37/107; F16L 37/113; F16L 39/00
(Continued)

(56) References Cited

U.S. PATENT DOCUMENTS 4,280,719 A    7/1981  Daniel et al.
2010/0319925 A1  12/2010  Papon et al.
(Continued)

FOREIGN PATENT DOCUMENTS

FR    2925105 A1    6/2009
FR    2956693 A1    8/2011
(Continued)

OTHER PUBLICATIONS

International Search Report for PCT/EP2016/077754, dated Jan. 27, 2017; English translation submitted herewith (5 pgs.).

*Primary Examiner* — Anna M Momper
*Assistant Examiner* — Patrick F Lambe
(74) *Attorney, Agent, or Firm* — Fitch, Even, Tabin & Flannery, LLP

(57) ABSTRACT

The present invention relates to a compact connector design with an internal locking ring (11). The connector according to the invention comprises a locking ring (11) allowing bayonet type connection on either side with two riser sections. Furthermore, the connector comprises at least one removable pin (12) for translationally blocking locking ring (11), notably upon locking and unlocking.

30 Claims, 5 Drawing Sheets

(51) Int. Cl.
  *F16L 25/06*     (2006.01)
  *F16L 37/113*    (2006.01)
  *F16L 39/00*     (2006.01)
  *E21B 33/038*    (2006.01)
  *F16L 37/107*    (2006.01)

(52) U.S. Cl.
  CPC ............ *F16L 25/06* (2013.01); *F16L 37/107* (2013.01); *F16L 37/113* (2013.01); *F16L 39/00* (2013.01)

(58) Field of Classification Search
  USPC ........................................................ 166/345
  See application file for complete search history.

(56) References Cited

U.S. PATENT DOCUMENTS

| | | |
|---|---|---|
| 2011/0203804 A1 | 8/2011 | Guesnon et al. |
| 2013/0020087 A1 | 1/2013 | Guesnon et al. |
| 2017/0074052 A1 | 3/2017 | Persent et al. |
| 2017/0074053 A1 | 3/2017 | Persent et al. |

FOREIGN PATENT DOCUMENTS

| | | |
|---|---|---|
| FR | 2956694 A1 | 8/2011 |
| WO | 2015/071411 A2 | 5/2015 |
| WO | 2015/169559 A1 | 11/2015 |
| WO | 2015/169560 A1 | 11/2015 |
| WO | WO-2015169559 A1 * | 11/2015 |

\* cited by examiner

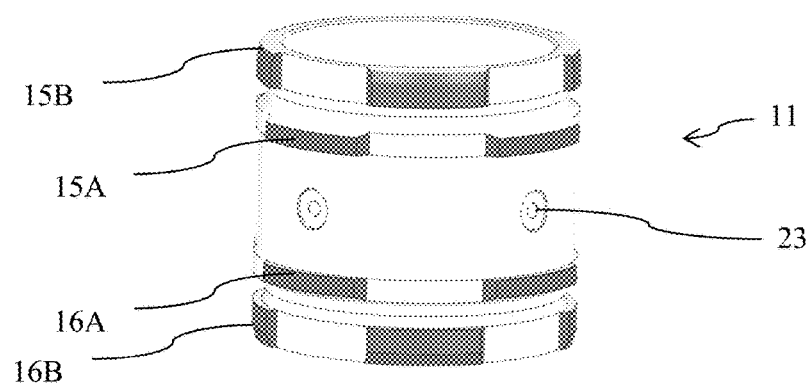
Figure 6
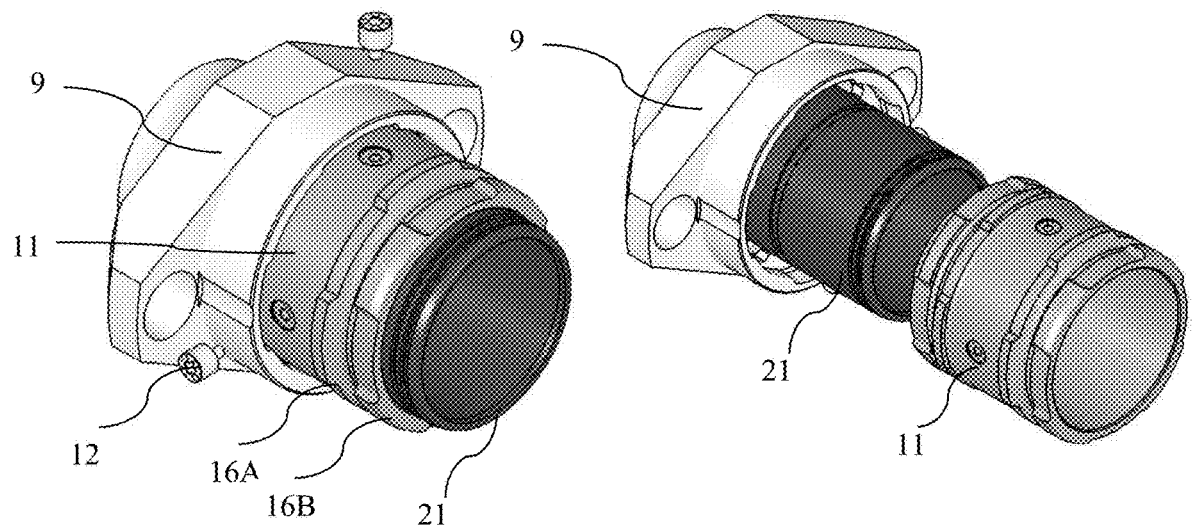
Figure 7a
Figure 7b

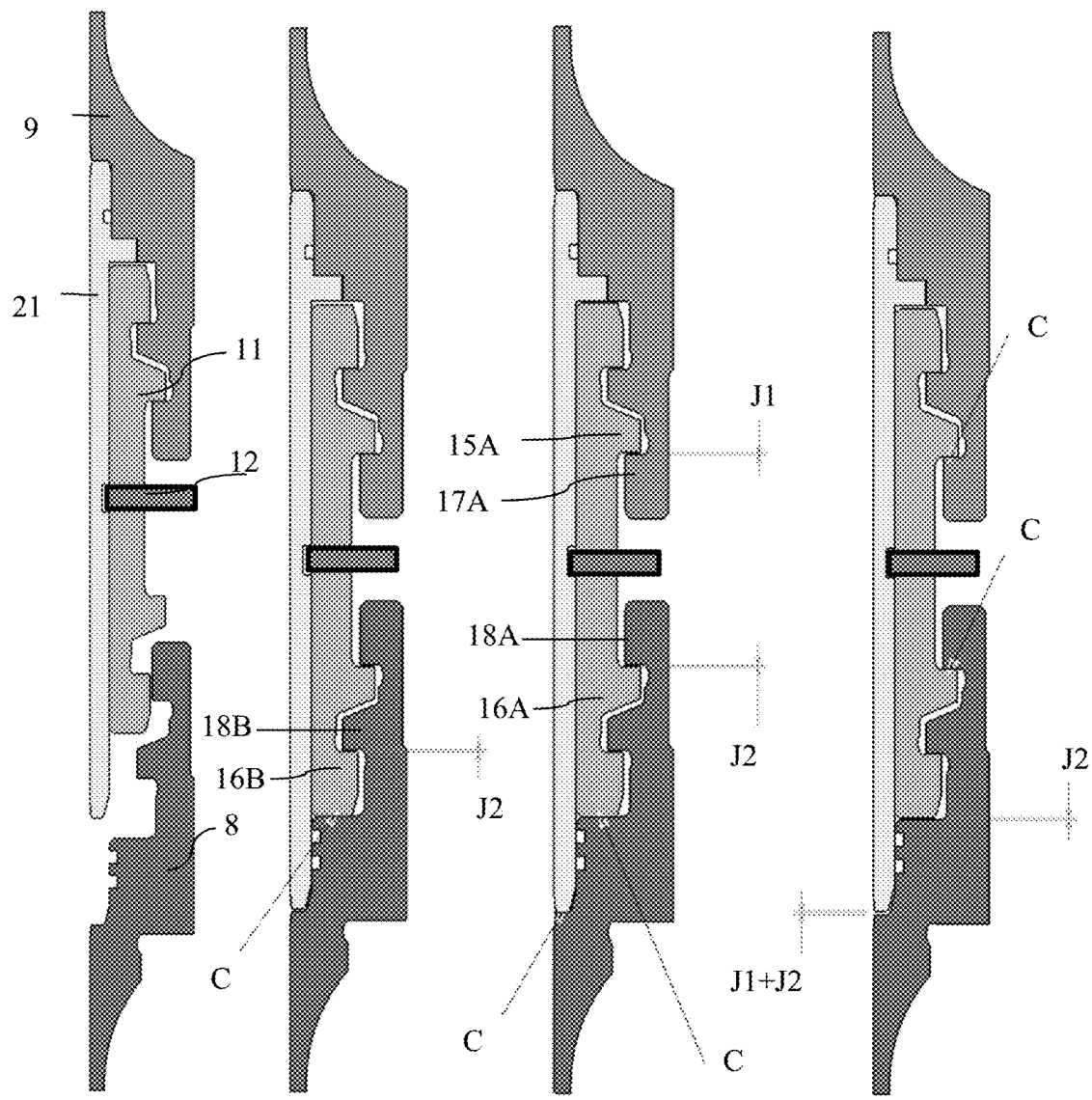

CONNECTOR FOR ASSEMBLING TWO RISER SEGMENTS, COMPRISING AN INTERNAL LOCKING RING AND REMOVABLE PINS

CROSS-REFERENCE TO RELATED APPLICATIONS

This application is a U.S. national phase application filed under 35 U.S.C. § 371 of International Application No. PCT/EP2016/077754, filed Nov. 15, 2016, designating the United States, which claims priority from French Patent Application No. 15/62.605, filed Dec. 17, 2015, which are hereby incorporated herein by reference in their entirety.

FIELD OF THE INVENTION

The present invention relates to the field of deepwater oil drilling and reservoir development. It concerns a riser connector.

BACKGROUND OF THE INVENTION

A drilling riser is made up of an assembly of tubular elements of length ranging between 15 and 27 m (50 and 90 feet), assembled by connectors. The tubular elements generally consist of a main tube provided with a connector at each end. Tubular auxiliary lines, also called peripheral lines, commonly referred to as "kill line", "choke line", "booster line" and "hydraulic line", allowing circulation of technical fluids, are provided parallel to the main tube. The tubular elements are assembled on the drilling site, from a floater. The riser is lowered into the water depth as the tubular elements are assembled, until it reaches the wellhead located on the sea bottom.

In the perspective of drilling at water depths that can reach 3500 m or more, the weight of the riser becomes very penalizing. This phenomenon is increased by the fact that, for the same maximum working pressure, the length of the riser requires a larger inside diameter for the auxiliary lines, considering the necessity to limit pressure drops.

Besides, the necessity to decrease the riser assembly time is all the more critical since the water depth, and therefore the riser length, is great.

A riser intended for other applications, notably production, completion or workover, also consists of an assembly of tubular elements assembled by connectors.

Documents FR-2,925,105, FR-2,956,693 and FR-2,956,694 describe various solutions notably aiming to involve the auxiliary lines, together with the main tube, in the taking up of the longitudinal stresses applied to the riser. However, for the systems described in these patents, fastening of the auxiliary lines with respect to the main tube causes tensile stresses in the auxiliary lines. In order to withstand these tensile stresses, the auxiliary lines have great thickness values, which generates an increase in the mass and size of the floats, and therefore in the cost of the riser. Another problem with these connectors concerns the inspection and maintenance of the locking ring. Indeed, the locking rings in the aforementioned patents are not fully removable. It is therefore not possible to inspect the entire locking ring.

To overcome this problem, patent applications WO-2015/071,411, WO-2015/169,560 and WO-2015/169,559 relate to connectors provided with locking rings removable by means of two bayonet connections. However, these three connectors require a particular layout for the studs to prevent simultaneous disconnection of the ring with the two riser sections.

The present invention describes a compact connector design with an internal locking ring. The connector according to the invention comprises a locking ring allowing a bayonet type connection on either side with two riser sections. Besides, the connector comprises at least one removable pin for translationally blocking the locking ring, notably upon locking and unlocking. Thus, the connector according to the invention is removable, and simultaneous removal of the ring with the two riser sections is prevented.

SUMMARY OF THE INVENTION

The invention relates to a connector for assembling two riser sections, comprising a first main tube element extended by a male connector element, a second main tube element extended by a female connector element, the male connector element fitting into said female connector element so as to connect said two main tube elements, said connector comprising means for locking said assembly that include a locking ring, said locking ring comprising a first and a second series of studs on the outer surface thereof and said male and female connector elements respectively comprising on the inner face thereof a third and a fourth series of studs respectively cooperating with said first and second series of studs. Said locking means further comprise at least one removable pin arranged in said locking ring and cooperating with said male connector element so as to translationally block said locking ring with respect to said male connector element.

According to one embodiment, the studs of the first and second series of studs project over identical angular ranges.

Advantageously, said removable pin cooperates with a groove provided in said male connector element or with a shoulder provided in said male connector element.

According to a design, said male connector element comprises an end piece and a sleeve provided with said groove or said shoulder, said sleeve being suited to be fitted into said female connector element.

Preferably, the sleeve is bolted to said end piece.

According to an implementation, each series of studs comprises at least one row of studs, preferably two rows of studs.

According to a variant, the circumferential distributions of said studs of two consecutive rows of studs of the same series of studs are alternated.

According to a characteristic, at least one row of studs of a series of studs is inscribed in a different diameter than another row of said series of studs.

According to an embodiment of the invention, said rows of studs of at least one series of studs are inscribed in identical diameters.

Advantageously, said locking means comprise a plurality of removable pins, preferably a number of removable pins corresponding to the number of studs per row of studs.

According to a design, said removable pin is threaded and said removable pin is arranged in said locking ring by screwing.

According to an embodiment, said removable pin is arranged in said locking ring between said first and said second series of studs.

According to a variant embodiment, said series of studs comprise at least three studs, preferably at least four studs.

According to an embodiment design, said male and female connector elements are respectively provided with a flange for respective passage of a first and a second auxiliary tube element.

According to a first variant embodiment, said auxiliary tube elements are fixedly secured to said flanges.

According to a second variant, one auxiliary tube element is secured to one of said flanges and the other auxiliary tube element is connected by a sliding pivot connection to the other one of said flanges, said sliding pivot connection allowing a relative translational motion between said main tube element and said auxiliary tube element over a limited distance.

According to a third variant, said two auxiliary tube elements are connected by a sliding pivot connection to said flanges.

According to an embodiment, a first axial clearance is provided between said first series of studs and said third series of studs, and a second axial clearance is provided between said second series of studs and said fourth series of studs.

Advantageously, said first and second axial clearances range between 0.5 and 30 mm, preferably between 0.5 and 10 mm.

The present invention further relates to a riser comprising at least two riser sections assembled by a connector according to one of the above characteristics.

Furthermore, the invention relates to a method of assembling two riser sections by means of a connector according to one of the above characteristics. The following steps are therefore carried out:
a) inserting said locking ring into said male connector element,
b) inserting said removable pin into said locking ring,
c) inserting said locking ring into said female connector element, and
d) locking said locking ring.

According to an implementation of the invention, the locking step is carried out through relative rotation of said locking ring with respect to said main tube elements.

According to an embodiment of the invention, at least one insertion of said locking ring into said male or female connector element is carried out through relative translation of said locking ring with respect to said male or female connector element.

According to a variant embodiment, at least one insertion of said locking ring into said male or female connector element is carried out through at least a first relative translation, a first relative rotation and a second relative translation of said locking ring with respect to said male or female connector element.

Moreover, the invention relates to a method of disassembling two riser sections assembled by means of a connector according to one of the above characteristics, characterized in that the following steps are carried out:
a) unlocking said locking ring,
b) removing a first main tube element from said locking ring,
c) removing said removable pin from said locking ring, and
d) removing said locking ring from the second main tube element.

According to an embodiment, the unlocking step is carried out through relative rotation of said locking ring with respect to said main tube elements.

According to a variant embodiment, at least one removal of at least one main tube element from said locking ring is carried out through relative translation of said locking ring with respect to said main tube element.

According to an implementation of the invention, at least one removal of at least one main tube element from said locking ring is carried out through a first relative translation, a first relative rotation and a second relative translation of the locking ring with respect to said main tube element.

Furthermore, the invention relates to the use of a riser according to one of the above characteristics for performing offshore well drilling or workover or production operations.

BRIEF DESCRIPTION OF THE FIGURES

Other features and advantages of the system and of the method according to the invention will be clear from reading the description hereafter of embodiments given by way of non limitative example, with reference to the accompanying figures wherein:

FIG. 6 illustrates a locking ring for a connector according to an embodiment of the invention, FIGS. 7a and 7b illustrate two steps of disassembling the locking ring according to an embodiment of the invention, and FIGS. 8a to 8d illustrate the distribution of the clearances for an embodiment of the invention, for the following steps respectively: approach, contacting the ring with the female connector element, locking and tensioning.

DETAILED DESCRIPTION OF THE INVENTION

Figure 1:
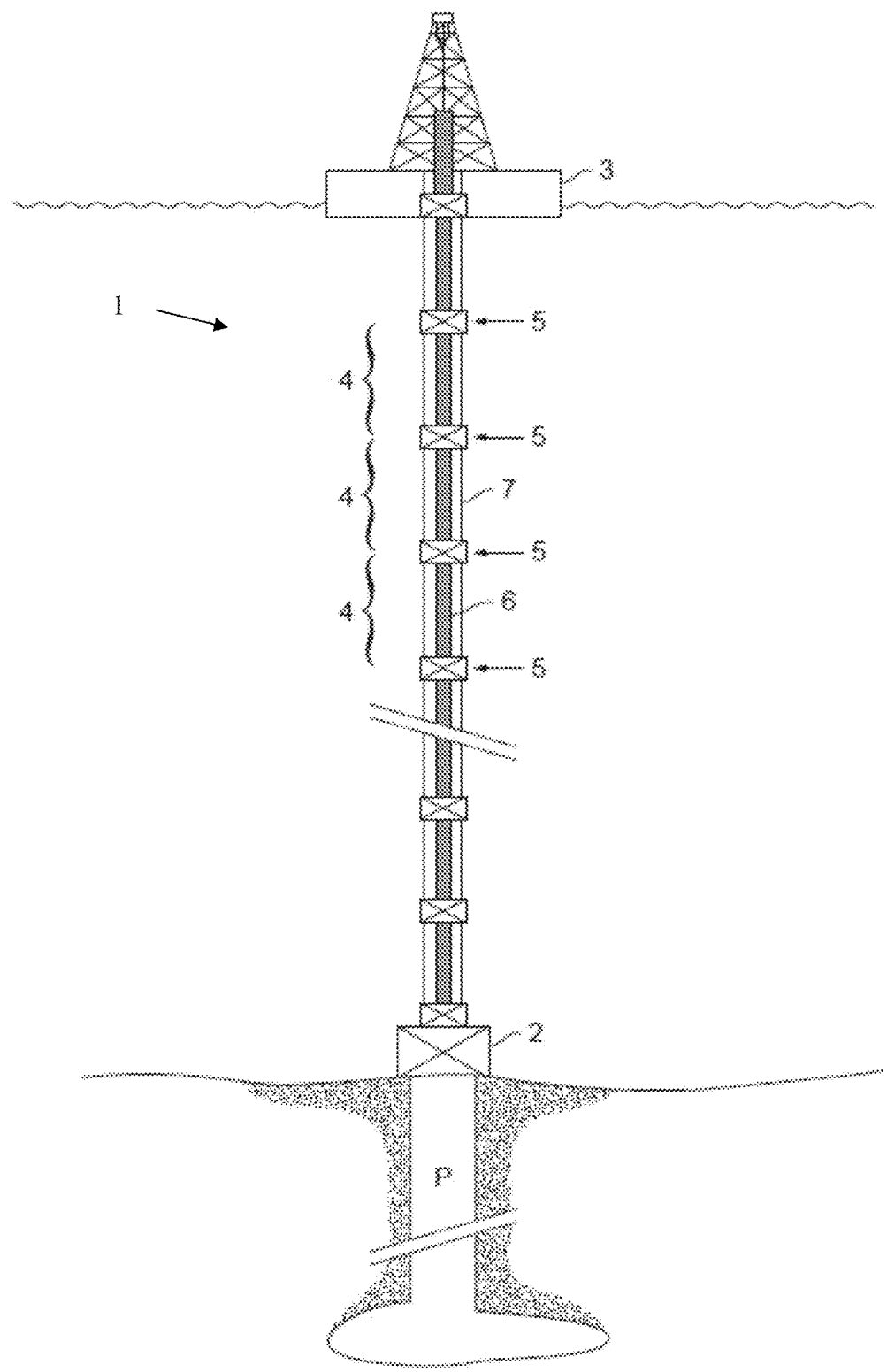
FIG. 1 schematically shows a riser according to the invention.

According to a non-limitative example embodiment, FIG. 1 schematically shows a riser 1 installed offshore. Riser 1 extends well P and it stretches from wellhead 2 to floater 3, a platform or a vessel for example. Wellhead 2 is provided with a preventer commonly referred to as "B.O.P." or "Blow-Out Preventer". Riser 1 is made up of an assembly of several sections 4 assembled end to end by connectors 5. Each section consists of a main tube element 6 provided with at least one auxiliary tube element 7, also referred to as peripheral line. The auxiliary lines referred to as kill lines or choke lines are used to provide well safety during control procedures relative to the inflow of fluids under pressure in the well. The line referred to as choke line is a safety line carrying fluids (oil, water, gas) coming from the well in the event of an inflow and driving them towards the choke manifold and the flare. The line referred to as kill line is a safety line enabling injection into the well of heavy fluids and cements allowing an otherwise uncontrollable blowout to be stopped. The auxiliary line referred to as booster line allows mud to be injected into the well in order to increase the annulus velocity thereof and to prevent sedimentation of the cuttings; it is also used for replacing the mud contained in the riser by water prior to disconnection. The line referred to as hydraulic line allows the wellhead preventer to be controlled. Hydraulic lines allow the BOP safety devices (valves and accumulators) to be supplied with hydraulic fluid (glycol-laden distilled water) under pressure.

Figure 2:
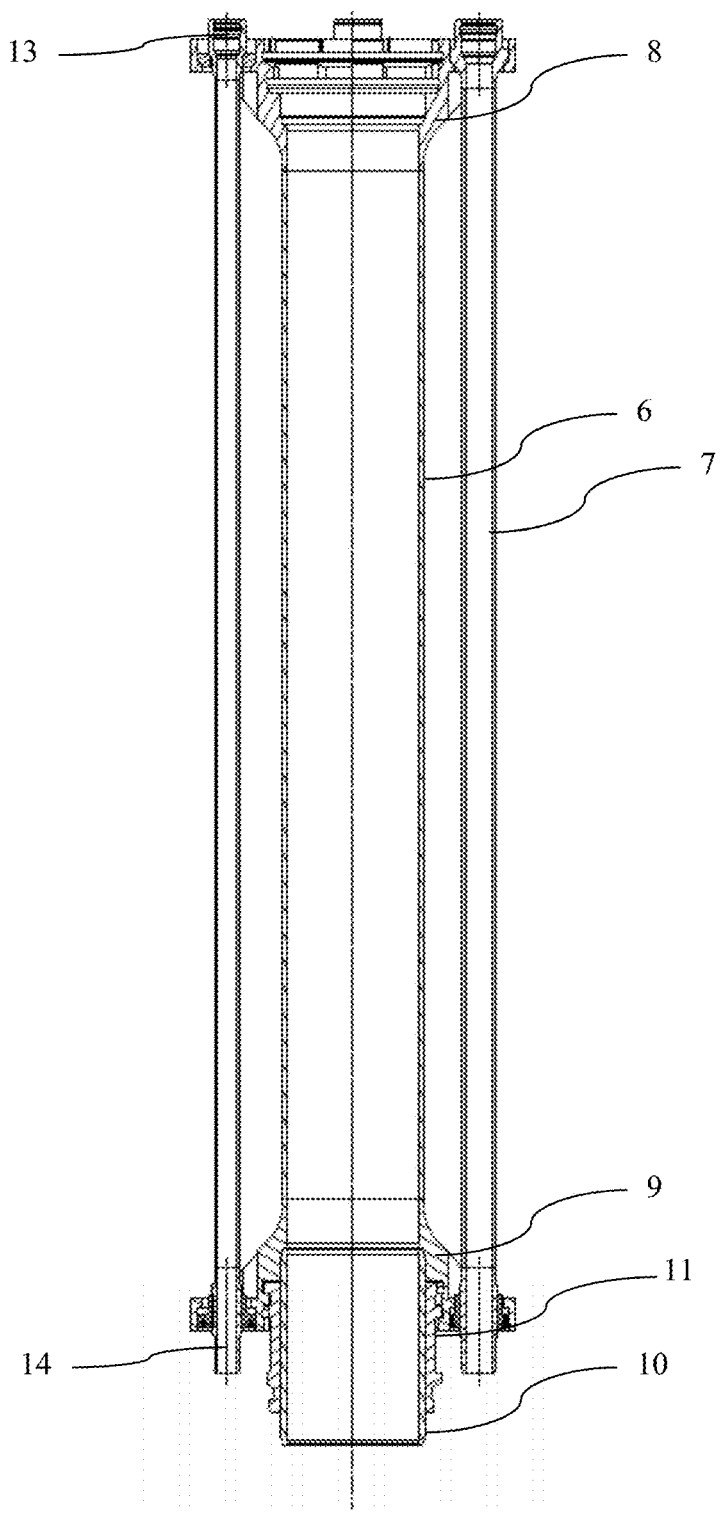
FIG. 2 illustrates a riser section according to an embodiment of the invention.

FIG. 2 diagrammatically shows a section 4 of the riser according to an embodiment of the invention. Section 4 comprises a main tube element 6 whose axis forms the axis of the riser. Auxiliary tubes 7 make up auxiliary lines or tubes arranged parallel to the axis of the main tube. Auxiliary tube elements 7 have lengths substantially equal to the length of main tube element 6, generally ranging between 10 and 30 meters. There is at least one line 7 arranged on the periphery of the main tube. In FIG. 2, two lines 7 are schematically shown.

A connector 5 shown in FIG. 1 consists of two elements designated, with reference to FIG. 2, by female connector element 8 and male connector element 9. Connector elements 8 and 9 are mounted at the ends of main tube element 6. Female connector element 8 is secured to tube 6, for example by welding, by screwing, by crimping or by clamping linkage. Male connector element 9 is secured to tube 6, for example by welding, by screwing, by crimping or by clamping linkage. For this illustrated example embodiment, the assembly of male connector element 9 with a female connector element 8 of another section forms connector 5 that transmits stresses from a riser section to the next section, notably the longitudinal stresses undergone by the riser.

The connector according to the invention is suited for a drilling riser, for example as described in connection with FIGS. 1 and 2, but the connector according to the invention can also be suited for a completion, workover or production riser, whose particular feature is notably to have no auxiliary line. According to the invention, the connector comprises:

a first main tube element extended by a male connector element, which can be optionally provided with guide means (a male flange for example) for passage of an auxiliary tube element (in cases where the riser comprises at least one auxiliary line), a second main tube element extended by a female connector element, which can be optionally provided with guide means (a female flange for example) for passage of an auxiliary tube element (in cases where the riser comprises at least one auxiliary line), the male connector element fitting into the female connector element so as to connect the main tube elements and the auxiliary tube elements, optionally a first auxiliary tube element passing through the male flange, optionally a second auxiliary tube element passing through the female flange, and means for locking the assembly, comprising:

a locking ring, referred to as internal locking ring, arranged within the male and female connector elements, the locking ring comprising, on the outer face thereof, a first series and a second series of studs suited to cooperate with a third series and a fourth series of studs respectively arranged on inner surfaces of the male and female connector elements, and at least one removable pin, the removable pin being arranged in the locking ring and suited to cooperate with the male connector element so as to translationally block the locking ring with respect to the male connector element, and the removable pin can notably cooperate with a groove provided in the locking ring, or notably with a shoulder provided in the locking ring.

Thus, by means of the four series of studs, two bayonet type connections are formed: a first one between the locking ring and the male connector element, and a second one between the locking ring and the female connector element. The locking ring is thus made removable with respect to the male and female connector elements, which allows inspection and maintenance thereof.

Arranging the ring inside the male and female connector elements allows to reduce the size of the connector and thus provides connector compactness.

The removable pin is suited to cooperate with the male connector element in order to prevent axial translation of the locking ring with the male connector element. The removable pin can notably cooperate with a groove provided in the locking ring or with a shoulder provided in the locking ring. Thus, upon assembly of two sections by means of the connector, it is possible to prevent removal of the locking ring, upon assembly or disassembly of the female connector element. Advantageously, the removable pin, once mounted in the locking ring, projects on the inner part of the locking ring. The projection distance of the removable pin can be equivalent to the depth of the groove or of the shoulder provided in the male connector element. The removable pin can be mounted on the outer surface of the locking ring. The removable pin can be inserted in the locking ring once the first assembly (locking ring and a male connector element) is assembled but not locked. The removable pin can be removed from the locking ring once the second assembly (locking ring and female connector element) is disassembled and the first assembly (locking ring and male connector element) is unlocked.

According to an embodiment of the invention, the studs of the first and second series of studs (and a fortiori of the third and fourth series of studs) project over identical angular ranges. The angular range of a stud is understood to be the angle formed by the disc portion occupied by the stud over the diameter in which it is inscribed. For example, if a series of studs comprises studs representing each one sixth of a disc, the angular range of the stud is 60°. Thus, with this design, locking and unlocking of the locking ring with respect to the two connector elements can result from a single rotation and become simultaneous. The locking ring is therefore driven in rotation only between two angular positions.

According to a first implementation of the invention, the circumferential distributions of the first and second series of studs are symmetrical with respect to a radial plane passing through the two series of studs. In other words, the studs of the first and second series of studs face each other (are aligned). Thus, the locking ring can have a symmetry plane, which can facilitate the design thereof. According to a second implementation of the invention, the circumferential distributions of the first and second series of studs are opposed: the circumferential distribution of the second series of studs is offset with respect to the first series of studs, by an angle corresponding to the angular range of a stud. In other words, the studs of a series face the intervals of the other series. According to a third implementation of the invention, the circumferential distributions of the studs of the first and second series are offset in relation to one another, by an angle corresponding to half the angular range of a stud (or any other angle).

Alternatively, the studs of the first and second series of studs (and a fortiori of the third and fourth series of studs) project over different angular ranges. Thus, unlocking of the two bayonet connections is achieved through distinct rotations.

Preferably, the locking ring can be made in a single piece.

The connector can be designed and dimensioned so as to meet the specifications mentioned by the API 16 R and API 2 RD standards edited by the American Petroleum Institute.

The various embodiments described above and hereafter can be combined so as to combine the effects thereof.

According to an embodiment of the invention, the male connector element can be formed with an end piece and a sleeve. The end piece comprises a first end intended to be fixed to a main tube element and a second end comprising, on the inner surface thereof, the third series of studs, which is intended to cooperate with the locking ring. The sleeve abuts against a shoulder of the end piece and it is fixed in the end piece, at one end of the sleeve, by bolting for example. On the other side, the sleeve projects so as to fit into the female connector element. The sleeve has a substantially cylindrical shape. The end piece, on the part thereof used for connection with the locking ring, comprises an inside diameter greater than the outside diameter of the locking ring. The sleeve comprises an outside diameter substantially corresponding to the inside diameter of the locking ring. The sleeve comprises, on the outer surface thereof, the groove intended to receive at least one removable pin projecting on the inner surface of the locking ring. In this case, the locking ring is inserted between the sleeve and the third and fourth series of studs.

According to a design of the invention, the removable pin can be threaded. It can then be mounted in the locking ring by screwing. This design enables fast assembly of the removable pin. In order to allow ease of assembly, the removable pin can be hollow to enable manipulation thereof with a tool.

According to a feature of the invention, the pin can have any shape, notably cylindrical (of circular or elliptical section), conical, parallelepipedic (of rectangular or square section), etc.

The removable pin can be arranged in the locking ring between the first and second series of studs. Thus, the removable pin can be substantially in the centre of the locking ring.

The groove provided in the male connector element (or, as the case may be, in the sleeve) can advantageously have a depth and a width greater than the dimensions of the removable pin, so as to allow the removable pin to slide in the groove, in particular to enable rotation of the locking ring when the removable pin is mounted.

According to an embodiment of the invention, each series of studs can comprise at least one row of studs. A row of studs is understood to be a circumferential distribution of the studs. Each row of studs has an alternation of projecting studs and of void spaces (intervals), these void spaces allowing passage of the corresponding studs of the series of studs with which the row of studs cooperates.

According to an implementation of the invention, the series of studs can comprise a plurality of rows of studs, in particular two or three rows of studs. The plurality of rows of studs allows the axial loads on the studs to be decreased, which allows to limit the mechanical fatigue of the studs.

According to a possible design, each series of studs comprises a single row of studs. According to a first alternative, each series of studs comprises two rows of studs. According to a second alternative, each series of studs comprises three rows of studs. According to a third alternative, two of the four series of studs comprise one row of studs and the other two series comprise two rows of studs. According to a fourth alternative, two of the four series of studs comprise two rows of studs and the other two series comprise three rows of studs.

In cases where a series of studs comprises several rows of studs, then the rows of studs can be inscribed in different diameters. This design allows to pass the row of studs of smaller diameter, and it is thus possible to lock and unlock the bayonet connection with a single rotation.

In cases where a series of studs comprises several rows of studs, then the rows of studs can be inscribed in identical diameters. This design requires insertion and locking of the bayonet connection by a relative motion consisting of a first translation, a first rotation, a second translation and a second rotation. This design thus allows better connection security because it allows unwanted disconnection to be avoided.

Each row of studs comprises a plurality of studs evenly distributed over a diameter. Advantageously, the studs of the various rows can be arranged to allow 360° locking. According to a design, the rows of studs can comprise three studs having an angular range of 60°, or 40°. According to an alternative, the rows of studs can comprise four studs having an angular range of 45°, or 30°. According to an alternative, the rows of studs can comprise five studs having an angular range of 36°, or 24°. According to another alternative, the rows of studs can comprise six studs having an angular range of 30°, or 20°. According to an alternative, the rows of studs can comprise eight studs having an angular range of 22.5°, or 15°. In order to have the studs projecting over identical angular ranges, all the rows of all the series of studs can comprise the same number of studs.

According to an embodiment of the invention, the locking means comprise a plurality of removable pins. It is thus possible to distribute the stresses among the removable pins. For this embodiment, a number of removable pins corresponding to the number of studs of the third series or of the fourth series of studs (a fortiori of the first or of the third series of studs) can be provided. Alternatively, a number of removable pins substantially corresponding to half the number of studs of the third or of the fourth series of studs can be provided. This alternative allows to obtain a compromise between the number of pins and the stresses exerted on the pins.

Figure 3:
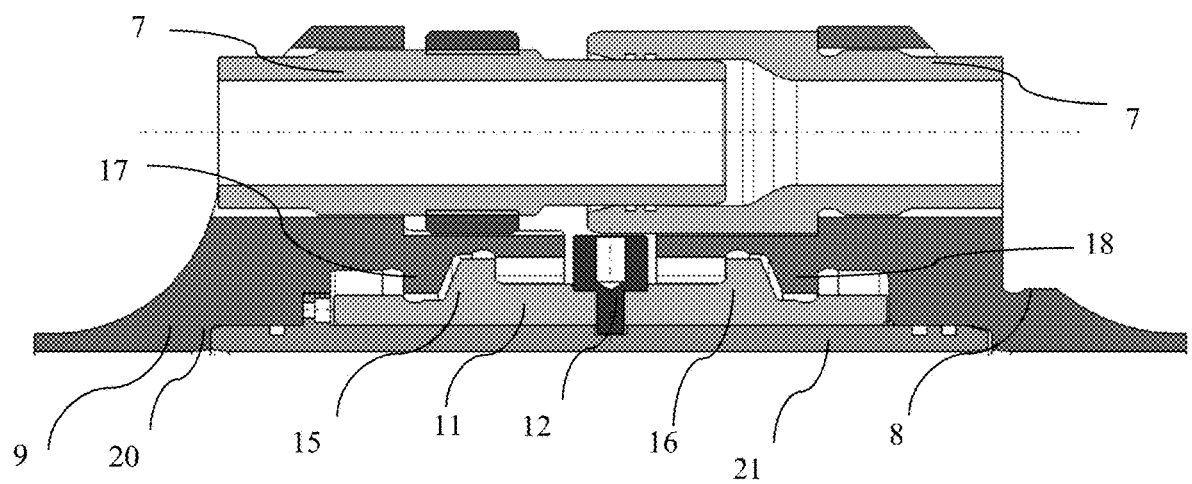
FIG. 3 illustrates the connector according to an embodiment of the invention.

FIG. 3 illustrates, by way of non limitative example, a connector according to an embodiment of the invention, the connector assembling two riser sections. FIG. 3 corresponds to a sectional view of the connector. In this figure, only one side of the sectional view is shown, the second side can be deduced by axial symmetry. The axis of the sections and of the connector is represented horizontally. In the figure, the flanges and auxiliary tube elements 7 are shown, but they are not necessary to the connector according to the invention. A male connector element 9 is fitted in a female connector element 8. Male connector element 9 comprises an end piece 20 and a sleeve 21. Locking means lock the assembly. The locking means comprise a locking ring 11. Locking ring 11 comprises, on the outer face thereof, a first series of studs 15 and a second series of studs 16. First series of studs 15 cooperates with a third series of studs 17 arranged on the inner face of male connector element 9, in particular of end piece 20. Second series of studs 16 cooperates with a fourth series of studs 18 arranged on the inner face of female connector element 8. Besides, the locking means comprise at least one removable pin 12. Removable pin 12 is mounted in locking ring 11 so as to project on the inner part thereof. Removable pin 12 is suited to cooperate with a groove provided in sleeve 21. The removable pin 12 illustrated has a substantially cylindrical shape with a shoulder. The shoulder allows precise positioning of removable pin 12 in the locking ring. Furthermore, the removable pin 12 illustrated is hollow for passage of a tool allowing setting thereof and/or for actuating locking ring 11, by means of an actuating bar for example.

Figure 4:
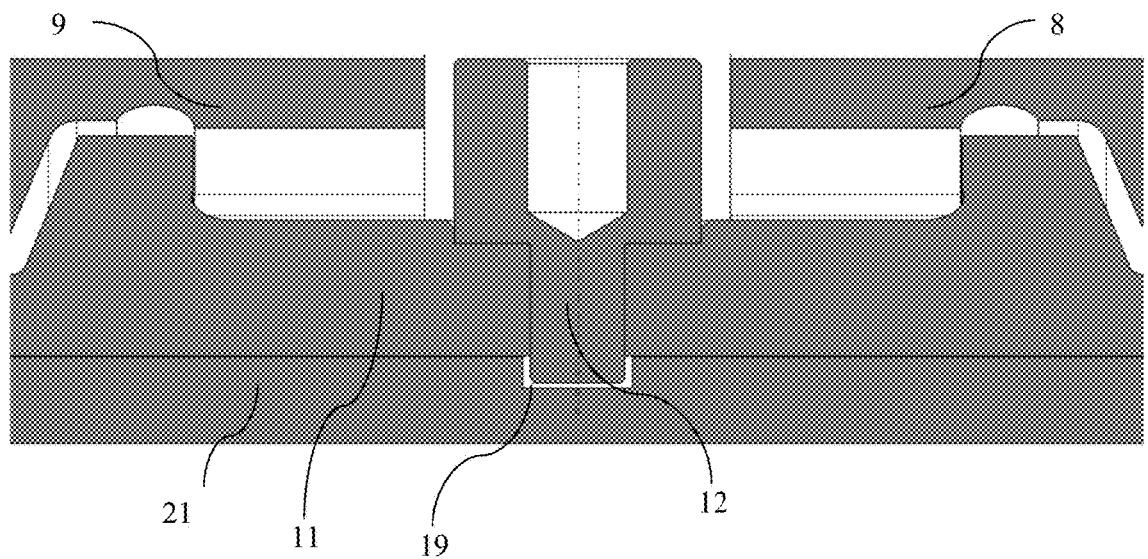
FIG. 4 is an enlarged view of the connector illustrated in FIG. 3.

FIG. 4 shows, by way of non limitative example, an enlarged view of FIG. 3 in the region of removable pin 12. Removable pin 12 is mounted in locking ring 11. It is located between the first series of studs and the second series of studs. Furthermore, the removable pin is located in an interval between male connector element 9 and female connector element 8. Removable pin 12 projects into locking ring 11 and it can slide in a groove 19 provided in sleeve 21. The dimensions (width, depth) of groove 19 are larger than the dimensions (diameter and length for example) of the end of the removable pin so as to allow removable pin 12 to slide in the groove.

Figure 5:
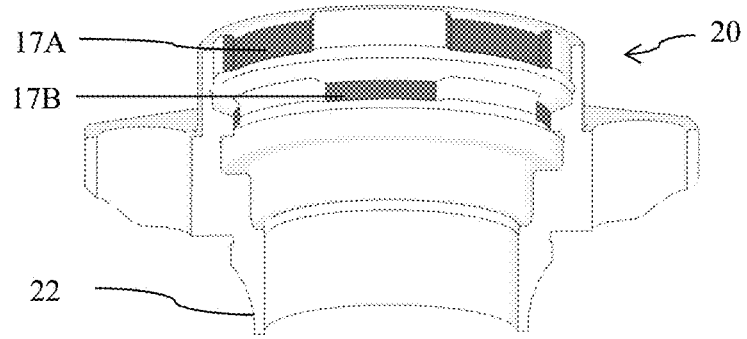
FIG. 5 illustrates, in partial view, a male or female connector element for a connector according to an embodiment of the invention.

FIG. 5 illustrates, by way of non limitative example, in a sectional view, an end piece 20 of a male connector element 9 for the embodiment of FIG. 3. In this figure, the sleeve that is intended to be fixed to end piece 20 is not shown. End piece 20 is a substantially cylindrical part comprising a first end 22 intended to be fixed to a main tube element. End piece 20 of male connector element 9 comprises, on the inner face thereof, a third series of studs consisting of two rows of studs 17A and 17B. Row 17A is the most central in the connector. According to the embodiment illustrated, each row of studs 17A, 17B comprises four studs having an angular range of 45°. The two rows of studs 17A, 17B are inscribed in different diameters. Thus, insertion and locking in the locking ring (and, conversely, unlocking and removal) is allowed through a single translation. Furthermore, the circumferential distributions of the studs of rows 17A, 17B are alternated: the studs of row 17A face (are aligned with) the intervals between two studs of row 17B and vice versa. This figure schematically shows, by way of non limitative example, the shape of the flange allowing passage of auxiliary tube elements.

The female connector element can be identical to end piece 20 shown in FIG. 5. In this case, it comprises a first end intended for a second main tube element, and two rows of studs forming the fourth series of studs. This embodiment allows standardization of the connector elements (part adaptable to the male or female connector element), which facilitates the manufacture thereof.

FIG. 6 illustrates, by way of non limitative example, a locking ring 11 for the embodiment of FIG. 3. Locking ring 11 is a substantially cylindrical part. Locking ring 11 comprises, on the outer surface thereof, a first series of studs 15 and a second series of studs 16. First series of studs 15 is suited to cooperate with the third series of studs of the male connector element. Second series of studs 16 is suited to cooperate with the fourth series of studs of the female connector element. According to the embodiment illustrated, each series of studs 15, 16 comprises two rows of studs 15A, 15B and 16A, 16B. Rows 15A and 16A are the most central rows of studs. Each row of studs comprises four studs having an angular range of 45°. In the example illustrated, the studs of the central rows of studs 15A, 16A are inscribed in smaller diameters than the diameters of outer rows of studs 15B, 16B. Furthermore, the circumferential distributions of the studs of rows 15A, 15B are alternated: the studs of row 15A face (are aligned with) the intervals between two studs of row 15B and vice versa. Similarly, the circumferential distributions of the studs of rows 16A, 16B are alternated: the studs of row 16A face (are aligned with) the intervals between two studs of row 16B and vice versa. Besides, for the embodiment illustrated, the circumferential distributions of the studs of the first and third series are symmetrical with respect to a radial plane between the first and third series of studs: the studs of row 15A face (are aligned with) the studs of row 16A, and the studs of row 15B face (are aligned with) the studs of row 16B. Locking ring 11 also comprises four orifices 23 for passage of the removable pins.

When the riser is provided with at least one auxiliary line, the male and female connector elements can comprise means for guiding the auxiliary tube elements. These guide means can be a flange (formed by an increase in the diameter of the male and female connector elements for example), a support (that can for example be fixed to the male and female connector elements), a guide plate (that can for example be fixed to the male and female connector elements) or any similar means. The flange, the support and the plate can comprise at least one orifice for passage of the auxiliary tube elements.

The connector according to the invention can be designed in such a way that the auxiliary tube element can have a relative motion with respect to the main tube element. Therefore, the two auxiliary tube elements can be mounted with a sliding pivot connection or a sliding connection in the guide means (for example in a support on one side and in a guide plate on the other). In the present application, a sliding pivot connection designates a link connecting a first solid to a second solid, the first solid can translate with respect to the second solid in the direction of an axis and the first solid can pivot with respect to the second solid about this axis. Thus, the auxiliary line element can slide and pivot in the axial direction thereof with respect to the main tube, and the auxiliary line element cannot move freely in the radial and tangential directions. In the present application, a sliding connection designates a link connecting a first solid to a second solid where the first solid can translate with respect to the second solid in the direction of an axis. Thus, the auxiliary line element can slide in the axial direction thereof with respect to the main tube.

In a variant, the connector according to the invention can be designed in such a way that the auxiliary tube element can have no relative motion with the main tube element. The two auxiliary tube elements can therefore be fixedly secured in the guide means, for example in the two flanges. Thus, the axial stresses can be distributed among the main line and the auxiliary lines.

Alternatively, the connector according to the invention can be designed in such a way that, on one side, the auxiliary tube element can have no relative motion with the main tube element and, on the other side, the auxiliary tube element can have a relative motion with the main tube element. The auxiliary tube element can therefore be fixedly secured to a first guide means, a flange for example, and it can be in sliding pivot connection with a second guide means, a flange for example. The relative motion distance can be limited, for example by a clearance adjustment means. In other words, the riser section comprises, at each end thereof, connection means schematized in FIG. 2 that allow, on one side, to axially connect an auxiliary line element 7 to main tube 6 and, on the other side, to form the sliding pivot connection between auxiliary line element 7 and main tube 6.

For the latter variant embodiment, the fixed connection between the auxiliary line element and the main line element is achieved at the female connector element, and the sliding pivot connection between the auxiliary line element and the main line element is achieved at the male connector element. Alternatively, the fixed connection between the auxiliary line element and the main line element is achieved at the male connector element, and the sliding pivot connection between the auxiliary line element and the main line element is achieved at the female connector element.

The auxiliary tubes undergo axial compressive stresses caused by the internal/external pressure difference that generates an "end effect" applied onto the tube ends (for example, the auxiliary lines can undergo pressures of the order of 1034 bars, i.e. 15,000 psi). Under such pressures, the main tube elements lengthen and the auxiliary line elements shorten until the clearance is zero. When the clearance becomes zero, all the lines lengthen identically. The main tube elements are likely to lengthen because they have to take up, totally or partly, the weight of the riser and the weight of the drilling mud on the one hand, and the tension forces imposed on the riser to keep it substantially vertical on the other hand. In general, the main tube elements at the top of the riser, i.e. close to the sea surface, are subjected to maximum tension forces, hence maximum elongation. The auxiliary line elements are likely to shorten under the effect of the difference between the internal pressure and the external pressure due to the fluid they contain. Indeed, the fluid applies a pressure onto the ends of the auxiliary tube elements by imposing compressive stresses on the auxiliary tube elements. Furthermore, the radial deformation of the tube due to the internal/external pressure difference causes shortening of the tube. In general, the elements at the foot of the riser, i.e. close to the sea bed, undergo the maximum internal/external pressure difference, therefore maximum shortening.

As long as the clearance is positive, the length of the auxiliary tube element and of the main tube element positioned at the same height can vary independently of one another. On the other hand, when the clearance becomes zero, i.e. when the clearance adjustment means is in contact with the flange, the auxiliary tube element and the corresponding main tube element 6 form a hyperstatic assembly: the auxiliary tube element is secured to the main tube element on the one hand at fastening means and, on the other hand, at the stop that is in contact with the flange. Therefore, the main tube element induces tension forces in the auxiliary tube element, and vice versa.

Thus, these connections allow to distribute the tension forces applied onto each riser section among main tube 6 and the auxiliary line elements. The integration according to the invention via the establishment of clearance J allows to increase the contribution of the main tube and consequently to reduce the axial stresses in the peripheral lines. Reduction of the axial stresses in the peripheral lines by means of this integration is beneficial for the dimensioning of the end pieces and the thickness of the auxiliary tubes.

Advantageously, the clearance is selected as a function of the length of the section; indeed, the deformations of the various lines depend on the length thereof. For a conventional riser section of 75 or 90 ft (22.86 m and 27.43 m), the clearance can be set between 0 and 1.5 inch (0 and approximately 38.1 mm). Preferably, the clearance can be selected between 0.1 and 1 inch (2.54 and 25.4 mm) for optimal distribution of the stresses in the lines, allowing to generate a decrease in the mass of the riser. Alternatively, the clearance can be selected between 0.1 and 0.25 inch (2.54 and 6.35 mm). According to an alternative, the clearance can be selected between 0.25 and 1 inch (6.35 and 25.4 mm). A preferred option providing a good compromise is a clearance of approximately 0.5 inch (12.7 mm) or 1 inch (25.4 mm).

According to an embodiment of the invention, the auxiliary tube elements are tubes hooped by reinforcement wires such as glass, carbon or aramid fibers, coated with a polymer matrix. Thus, the resistance and the weight of the auxiliary lines are optimized. Indeed, the present invention is particularly well suited for hooped auxiliary tube elements that afford the advantage of reducing the steel thickness and therefore the weight of the riser. The drawback of hooping, involving lower flexural rigidity, is compensated by the clearance that allows buckling of the auxiliary lines to be limited. Alternatively, the main tube and auxiliary tube elements can be made of metal alloy, for example aluminium alloy or titanium alloy.

In order to facilitate mounting and to avoid jamming of the studs caused by wear, at least one axial clearance can be provided between a connector element and the locking ring. Preferably, the axial clearance is strictly positive.

According to an embodiment of the invention, an axial clearance is provided between each connector element and the locking ring. Thus, problems linked to studs wear can be avoided, which facilitates handling of the locking ring. The two axial clearances can be identical or distinct. The axial clearances are distributed within the connector throughout the connector assembly, locking, unlocking, and tensioning steps. For example, upon assembly, an axial clearance may exist between the studs cooperating with one another and, once the connector locked and tensioned, an axial clearance may exist between the ends of the two connector elements.

Each axial clearance, strictly positive, can range between 0.5 and 30 mm, preferably between 0.5 and 10 mm. Above 30 mm, the technical effect relative to the avoidance of jamming problems remains, however it involves an increase in size.

Besides, according to a design of the connector, the ring can comprise ring rotation limiting means, stops for example, these means limiting a rotation of the locking ring for an angle equal to the angular range of the studs.

Furthermore, according to a feature of the invention, the connector can comprise means for blocking the locking ring in at least one position, notably in the locked position. These means can also allow to prevent rotation of the ring with respect to the male or female element in the unlocked position. The locking ring blocking means allow to avoid unwanted unlocking of the locking ring.

According to a design of the invention, the locking ring can comprise handling means external to the locking ring. These handling means allow the locking ring to be rotated. For example, the handling means can be a handling bar. According to a design, the handling means can be inserted in a pin.

Moreover, the present invention relates to a riser comprising at least two riser sections assembled by a connector as described above. The connector can be made according to any combination of the embodiments described above: plurality of removable pins, plurality of rows of studs, rows of studs inscribed in identical or distinct diameters, axial clearances, etc.

Furthermore, the present invention relates to the use of such a riser (with any combination of the embodiments described above) for performing offshore drilling, effluent production or wellbore workover operations.

Besides, the present invention relates to a method of assembling two riser sections by means of a connector according to the invention. The following steps can be carried out for this method:

a) inserting the locking ring into the male connector element, thus the first main tube element is positioned in the locking ring without being locked, b) inserting at least one removable pin into the locking ring until it penetrates the groove of the male connector element, thus the first main tube element is positioned in the locking ring while being translationally blocked and it still has a rotating motion, it is therefore not locked, c) inserting the locking ring into the female connector element, so that the male connector element fits into the female connector element, thus the second main tube element is positioned in the locking ring without being locked, and d) locking the locking ring by rotating the locking ring, this single rotation locks the two connector elements that have no more relative motion with respect to the locking ring.

For step d), upon locking, rotation of the ring generates the respective cooperation of the first and third series of studs, and of the second and fourth series of studs. The rotation enabling simultaneous locking of the two bayonet type connections is a rotation by an angle corresponding to the angular range of the studs. For example, if the angular range of the studs is 36°, the locking rotation is a 36° rotation.

For step b), axial translation blocking of the first main tube element with respect to the locking ring is achieved in the two axial directions by contact of the removable pin(s) with the groove.

The insertion steps consist in setting the locking ring in the connector element concerned, so that a single subsequent rotation allows the connector to be locked.

In some cases, the insertion steps correspond to a single relative translation motion of the ring with respect to the connector element. This is for example the case when the series of studs concerned only comprises one row of studs, or when the series of studs concerned comprises a plurality of rows of studs inscribed in different diameters. This translation allows the studs to be positioned for blocking the bayonet connection.

In other cases, the insertion steps correspond to a combined motion comprising a first stage of translation, followed by a first rotation, then a second translation. These are relative motions between the locking ring and the connector element concerned. It is for example the case when the series of studs concerned comprises a plurality of rows of studs inscribed in identical diameters. The first two relative motions allow to pass a first row of studs. The last translation stage allows the studs to be positioned for blocking the bayonet connection.

According to an embodiment of the invention, where several pins are mounted to cooperate with the studs of the male connector element, and where the first and the third series of studs comprise two rows of studs inscribed in different diameters, and the second and fourth series of studs comprise two rows of studs inscribed in different diameters, the method can comprise the following steps:

a) inserting the locking ring into the male connector element, by means of a single translation, b) inserting the removable pins into the locking ring, c) inserting the female connector element into the locking ring, by means of a single translation, so that the male connector element fits into the female connector element, and d) locking the locking ring by rotating the locking ring.

Furthermore, the present invention relates to a method of disassembling two riser sections assembled by means of a connector according to the invention. This method can comprise the following steps:

a) unlocking the locking ring by rotating the locking ring, this single rotation unlocks the two connector elements that can have relative motions with respect to the locking ring, b) removing the female connector element from the locking ring, so as to release the engagement of the male connector element in the female connector element, thus the female connector element is extracted from the locking ring while the male connector element is unlocked but translationally blocked in the locking ring, notably by at least one removable pin, c) removing at least one removable pin from the locking ring, thus the male connector element is positioned in the locking ring while being unlocked and moving freely, and d) removing the locking ring from the male connector element, thus the male connector element is extracted from the locking ring.

For step a), upon unlocking, rotation of the ring releases the respective cooperation of the first and third series of studs, and of the second and fourth series of studs. The rotation enabling simultaneous unlocking of the two bayonet type connections is a rotation by an angle corresponding to the angular range of the studs. For example, if the angular range of the studs is 36°, the unlocking rotation is a 36° rotation.

The removal steps consist in extracting the connector element concerned from the locking ring, from a position where the connector element is positioned in the locking ring.

In some cases, the removal steps correspond to a single relative translation motion of the ring with respect to the connector element. This is for example the case when the series of studs concerned only comprises one row of studs, or when the series of studs concerned comprises a plurality of rows of studs inscribed in different diameters. This translation allows the studs to be released from the bayonet connection.

In other cases, the removal steps correspond to a combined motion comprising a first stage of translation, followed by a first rotation, then a second translation. These are relative motions between the locking ring and the connector element concerned. It is for example the case when the series of studs concerned comprises a plurality of studs inscribed in identical diameters. The first translation stage allows the studs of the second series of studs to be disengaged. The last two relative motions allow to pass a first row of studs.

FIGS. 7a and 7b illustrate, by way of non limitative example, two steps of the disassembling process. FIG. 7a corresponds to the step of removing removable pins 12. FIG. 7b corresponds to the step of removing locking ring from male connector element 9. Prior to the removal of removable pins 12, the female connector element (not shown) has been removed. Locking ring 11 is then unlocked (the studs of the first and third series of studs do not cooperate), and locking ring 11 is held on sleeve 21 of male connector element 9 by removable pins 12. Removing removable pins 12 enables relative translational displacement of locking ring 11 (FIG. 7b) with respect to the male connector element. This relative translation allows locking ring 11 to be removed, notably for maintenance or inspection thereof.

According to an embodiment of the invention, where several pins are mounted to cooperate with the studs of the male connector element, and where the first and the third series of studs comprise two rows of studs inscribed in different diameters, and the second and fourth series of studs comprise two rows of studs inscribed in different diameters, the method comprises the following steps:

a) unlocking the locking ring by rotating the locking ring,
b) removing the female connector element from the locking ring with a single motion of translation so as to release the engagement of the male connector element in the female connector element,
c) removing the removable pins in the locking ring, and
d) removing the locking ring from the male connector element, by a single motion of translation.

For the embodiment where two axial clearances are provided on either side of the connector elements and the locking ring, the distribution of the axial clearances is illustrated in FIGS. 8a to 8d for various assembly stages. These figures are sectional views similar to the sectional view of FIG. 3 and they illustrate stages of assembling male connector element 9 in female connector element 8 by means of a locking ring 11 and removable pins 12. The male connector element comprises a sleeve 21.

Locking the connector can be achieved by means of the following operations:

1. Approach phase (FIG. 8a): fitting male part 9 into female part 8. The studs of locking ring 11 pass between those of female element 8.

2. Fitting continues (FIG. 8b), locking ring 11 comes into contact with the inner part of female element 8. At this stage, a shoulder of female connector element 8 is in contact C with the end of locking ring 11, while an axial clearance J2 exists between the studs of the second 16 and fourth 18 series of studs, i.e. between central rows 16A and 18A and between outer rows 16B and 18B of the second and fourth series.

3. At the end of the fitting step (FIG. 8c), sleeve 21 comes into contact against a shoulder of female element 8. At this stage, an axial clearance J1 exists between studs of the first 15 and third 17 series of studs (i.e. between central rows 15A and 17A, and between outer rows 15B and 17B of the second and fourth series), a shoulder of female connector element 8 is in contact C with the end of locking ring 11, while an axial clearance J2 exists between studs of the second 16 and fourth 18 series of studs (i.e. between central rows 16A and 18A, and between outer rows 16B and 18B of the second and fourth series). At the end of this step, the connector is ready to be locked.

4. The rotation of the ring for locking (FIG. 8d) causes the four rows of teeth to coincide. It no longer risks being impeded because the sliding surface is located in a low-stress area. After locking, tensioning of the riser brings the teeth of the two bayonet systems into contact. Thus, a contact C is achieved at the studs of the four series of studs and an axial clearance corresponding to the sum J1+J2 exists between the ends of sleeve 21 and a shoulder of female connector element 8. Furthermore, a clearance J2 can be present between the end of locking ring 11 and a shoulder of female connector element 8.

For this example, axial clearances J1 and J2 are strictly positive, they can be different or identical, and they can be 1, 2, 3, 4 or 5 mm.

The device according to the invention provides an attractive solution for rapidly and simply mounting a riser whose tension forces are distributed among the auxiliary tube elements and the main tube. Indeed, connection of one riser section to another riser section is achieved in a single operation through rotation of the locking ring. This connection allows to communicate and to seal the main tube element of a section with that of the other section and, simultaneously, to communicate and to seal the auxiliary line elements of one of the sections with those of the other section.

For the embodiment where the riser comprises at least one auxiliary line, the compact connector according to the invention allows to minimize the bending stresses in the flanges, and thus to reduce the dimensions of the flanges and to lighten the weight of the connectors. Besides, positioning the ring between the main tube element and the auxiliary tube elements allows to increase the strength of the connector. Indeed, the ring holds the flanges and prevents bending thereof. Moreover, this positioning allows to solve the problem of auxiliary line fittings interference because the bending moments caused by offset axial forces have unlike signs. Furthermore, in locked position, the studs of the ring are engaged with the studs of the female connector element that are positioned on the massive part of the female connector element.

The invention claimed is:

1. A connector for assembling two riser sections, comprising a first main tube element extended by a male connector element, a second main tube element extended by a female connector element, the male connector element fitting into the female connector element so as to connect said two main tube elements, a locking ring for locking together the male connector element and the female connector element, the locking ring comprising a first and a second series of studs on the outer surface thereof and the male and female connector elements respectively comprising on the inner face thereof a third and a fourth series of studs respectively cooperating with the first and second series of studs, and at least one removable pin arranged in the locking ring and cooperating with the male connector element so as to translationally block the locking ring with respect to the male connector element, wherein the at least one removable pin cooperates with a groove provided in the male connector element or with a shoulder provided in the male connector element.

2. A connector as claimed in claim 1, wherein the studs of the first and second series of studs project over identical angular ranges.

3. A connector as claimed in claim 1, wherein the male connector element comprises an end piece and a sleeve provided with the groove or the shoulder, the sleeve being suited to be fitted into the female connector element.

4. A connector as claimed in claim 3, wherein the sleeve is bolted to the end piece.

5. A connector as claimed in claim 1, wherein each series of studs comprises at least one row of studs.

6. A connector as claimed in claim 5, wherein each series of studs comprises at least two rows of studs and the circumferential distributions of the studs of two consecutive rows of studs of the same series of studs are alternated.

7. A connector as claimed in claim 5, wherein at least one row of studs of a series of studs is inscribed in a different diameter than another row of the series of studs.

8. A connector as claimed in claim 5, wherein the rows of studs of at least one series of studs are inscribed in identical diameters.

9. A connector as claimed in claim 5, wherein the locking means comprise a plurality of removable pins.

10. A connector as claimed claim 1, wherein the removable pin is threaded and the removable pin is arranged in the locking ring by screwing.

11. A connector as claimed in claim 1, wherein the removable pin is arranged in the locking ring between the first and the second series of studs.

12. A connector as claimed in claim 1, wherein the series of studs comprise at least three studs.

13. A connector as claimed in claim 1, wherein the male and female connector elements are respectively provided with a flange for respective passage of a first and a second auxiliary tube element.

14. A connector as claimed in claim 13, wherein the auxiliary tube elements are fixedly secured to the flanges.

15. A connector as claimed in claim 13, wherein one auxiliary tube element is secured to one of the flanges and the other auxiliary tube element is connected by a sliding pivot connection to the other one of the flanges, the sliding pivot connection allowing a relative translational motion between the main tube element and the auxiliary tube element over a limited distance.

16. A connector as claimed in claim 13, wherein the two auxiliary tube elements are connected by a sliding pivot connection to the flanges.

17. A connector as claimed in claim 1, wherein a first axial clearance is provided between the first series of studs and the third series of studs, and a second axial clearance is provided between the second series of studs and the fourth series of studs.

18. A connector as claimed in claim 17, wherein the first and second axial clearances range between 0.5 and 30 mm.

19. A riser comprising at least two riser sections assembled by a connector as claimed in claim 1.

20. A method for performing offshore well drilling or workover or production operations, comprising connecting the riser as claimed in claim 19 to a wellhead.

21. A method of assembling two riser sections by means of a connector as claimed in claim 1, wherein the following steps are carried out:
    a) inserting the locking ring into the male connector element,
    b) inserting the removable pin into the locking ring,
    c) inserting the locking ring into the female connector element, and
    d) locking the locking ring.

22. A method as claimed in claim 21, wherein the locking step is carried out through relative rotation of the locking ring with respect to the main tube elements.

23. A method as claimed in claim 21, wherein at least one insertion of the locking ring into the male or female connector element is carried out through relative translation of the locking ring with respect to the male or female connector element.

24. A method as claimed in claim 21, wherein at least one insertion of the locking ring into the male or female connector element is carried out through at least a first relative translation, a first relative rotation and a second relative translation of the locking ring with respect to the male or female connector element.

25. A method of disassembling two riser sections assembled by means of a connector as claimed in claim 1, wherein the following steps are carried out:
    a) unlocking the locking ring,
    b) removing a first main tube element from the locking ring,
    c) removing the removable pin from the locking ring, and
    d) removing the locking ring from second main tube element.

26. A method as claimed in claim 25, wherein the unlocking step is carried out through relative rotation of the locking ring with respect to the main tube elements.

27. A method as claimed in claim 25, wherein at least one removal of at least one main tube element from the locking ring is carried out through relative translation of locking ring with respect to the main tube element.

28. A method as claimed in claim 25, wherein at least one removal of at least one main tube element from the locking ring is carried out through a first relative translation, a first relative rotation and a second relative translation of locking ring with respect to the main tube element.

29. A connector as claimed in claim 1, wherein the at least one removable pin cooperates with a groove provided in the male connector element.

30. A connector as claimed in claim 1, wherein the at least one removable pin cooperates with a shoulder provided in the male connector element.

* * * * *